March 3, 1970  J. P. GILLIAM  3,498,322
CHECK VALVE
Filed May 10, 1967

INVENTOR.
JAMES P. GILLIAM
BY *Milford A. Juster*
   *Attorney*

United States Patent Office 3,498,322
Patented Mar. 3, 1970

3,498,322
CHECK VALVE
James P. Gilliam, R.R. 1, Box 880,
Deland, Fla. 32720
Filed May 10, 1967, Ser. No. 637,516
Int. Cl. F16k 15/03, 27/00, 15/06
U.S. Cl. 137—527.2                    4 Claims

ABSTRACT OF THE DISCLOSURE

A check valve for use in restricted space at the end of an inexpensive pipe nipple with a removable valve unit of non-corroding material including a sleeve secured by very fine screw threads to the inner periphery of the nipple providing the valve seat structure and the support for a movable valve head including a lug which movably supports the stem of the valve head, any transverse dimension of the valve head being appreciably less than the nipple diameter so that adequate clearance for opening of the valve is provided by a female coupling attached to the nipple.

---

In one form of the invention the valve seat is a radially extending flange which may be integral with the nipple and which flange provides a planar valve seat with one portion of the flange being of greater radial dimension. A lug projects beyond the nipple from said one portion of the flange and pivotally supports one end of a lever to an intermediate portion of which lever the stem of a valve head is pivotally connected. The lever has a small clearance between each end of the lever and the valve head to permit limited rocking while controlling the valve head movements to assure proper seating.

The present invention is an improvement over prior Patents 3,013,579 and 3,182,682 of the present applicant.

The present invention relates to valves and more particularly to check valves permitting flow of fluid to one direction and preventing reverse flow thereof.

Heretofore various types of check valves have been provided including those shown in the above-identified patents but these valves have been expensive to manufacture and have required large amounts of expensive non-corroding materials which resulted in high costs of production with corresponding high sales prices.

An object of the present invention is to provide a valve structure which overcomes the expensive constructions of the prior art and to provide a check valve having a long useful life.

Another object of the invention is to provide a removable valve unit of non-corroding material for mounting in an inexpensive tubular nipple which provides the supporting structure.

Other and further objects will be apparent as the description proceeds and upon reference to the drawing wherein.

Figure 1:
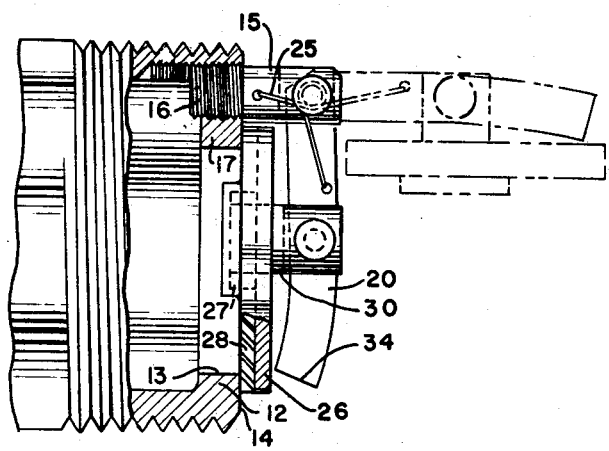
FIGURE 1 is an elevation with parts in section of a nipple having an integral valve seat thereon with a valve head pivotally mounted on a lug extending outwardly therefrom.
Figure 2:
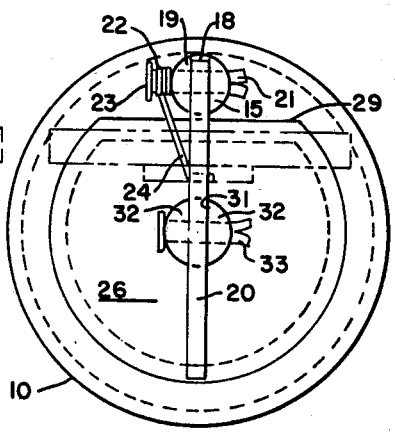
FIGURE 2 is an end view of the valve assembly of FIG. 1 with the valve closed.

Referring more particularly to the drawing, the valve of FIGURES 1 and 2 includes a tubular pipe nipple 10 having male threads for connection to a female coupling 11, said nipple having an inwardly extending flange 12 providing a fluid passage 13 formed by the inner periphery of the flange 12 with the outer surface of the flange being substantially planar and providing a valve seat 14. A lug 15 in the form of a stud includes a threaded end portion 16 screw threaded into a screw-threaded bore in a portion 17 of the flange forming the fluid passage 13 which is of greater radial dimension than the remainder of the flange. The lug 15 is provided with a slot 18 formed by bifurcations 19, 19 which receives a lever 20 of a length less than the diameter of the nipple 10. Lever 20 is pivotally mounted in the slot 18 of said lug 15 by a split pin 21 passing through aligned apertures in the bifurcations 19 and one end of the lever 20. The lever 20 is urged in a direction toward the nipple by a coil spring 22 having a number of coils surrounding the slit pin 21 and confined between the head 23 of such split pin and the adjacent bifurcation 19 of the lug 15, one arm 24 of said spring having a bent over portion extending into an aperture in the lever 20 and another arm 25 having a bent over portion received in the aperture in the lug 15.

A valve head including a disc 26 having a boss 27 is covered on its inner surface with a resilient rubber-like material 28 such as neoprene or the like with the peripheral portions thereof lying in a single plane and abutting the planar surface 14 of the flange 12 to provide a seal. The disc 26 and the material 28 are of generally circular form with a segment defined by a chord omitted to provide clearance between the chord edge of the disc and the lug 15 as clearly shown in FIGS. 1 and 2; it will be noted that the disc 26 and the fluid passage formed by the flange 13 are of D-shape.

The disc 26 is supported on a stem 30 screw threaded into the hub 27 and having a slot 31 in its other end forming bifurcations 32, 32 which embrace the lever 20 and are rockably connected to the lever 20 by a split pin 33 passing through aligned apertures in the intermediate portion of the lever and the bifurcations of the stud 30. The free end portion 34 of the lever 20 is curved toward the disc 26 but some clearance is provided between the end portion 34 of the lever 20 and the adjacent portion of the disc 26 and clearance is provided between the chord edge 29 of the disc and the end of the lever adjacent the pivot 21 whereby the valve head is maintained in generally parallel relation to the lever 20 while permitting limited rocking movement assuring accurate seating of the rubber-like material 28 of the valve head against the seat 14 of the nipple.

From the above description it will be apparent that fluid flowing in the direction of the arrow shown in FIG. 1 will cause the valve head 26 to open against the pressure of the spring 22 and the flow of fluid will maintain the valve head in open position as shown in dotted lines. However, reverse flow of the fluid will immediately cause the valve to close to its full line position by the motion of the fluid and the force of the spring 22, the spring 22 being of sufficient tension to assure proper operation of the valve in all positions thereof whereby the valve nipple may be mounted in any horizontal or vertical position or any angular position of the nipple avoiding binding between the surfaces of the parts and assuring proper seating of the valve head on its seat.

Figure 3:
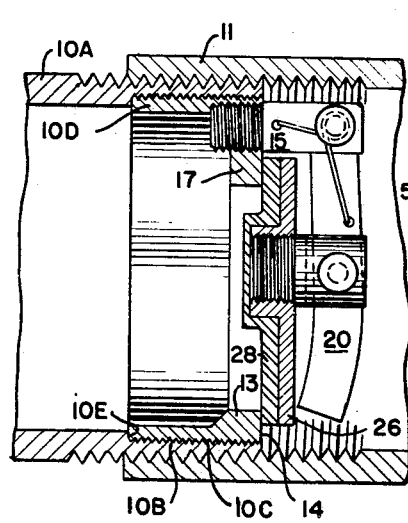
FIGURE 3 is a diametrical cross section of a similar valve with a removable valve unit including a sleeve threaded therein with the sleeve providing the valve seat and the mounting for the pivoted valve head and showing a female coupling secured to the nipple.

Referring to FIG. 3 wherein the parts are identified by the same reference numerals used above with postscripts to show differences, the galvanized iron nipple 10A has male screw threads and has a counter bore 10B threaded with fine screw threads 10C of approximately 18 threads to the inch. Mounted in such screw threads 10C is a brass sleeve 10D which provides the flange 13 including the seat 14 and enlargement 17 which receives the stud 15 which carries the lever 20 and the valve head including the disc 26 and resilient material 28. The inner end of the sleeve 10D abuts a shoulder 10E at the bottom of the counterbore providing a fluid tight joint with the screw threads 10C. The sleeve 10D including the seat 14 and the valve and its operating and supporting structure can be made as a unit of relatively expensive non-corroding material and assembled with the nipple 10A thereby limiting the accurate machining to the sleeve 10D and the valve parts while the nipple 10A can be made in the conventional manner with the threaded counterbore formed therein.

Figure 4:
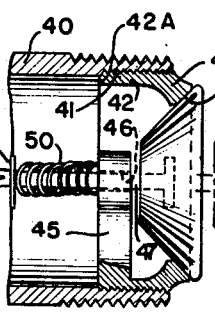
FIGURE 4 is a diametrical section of another form of valve including a pipe nipple with a removable valve unit including a sleeve providing a valve seat and the mounting for a poppet type valve.
Figure 5:
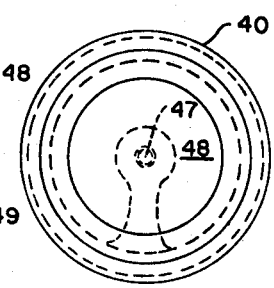
FIGURE 5 is an end view of the valve of FIG. 4.

Upon reference to FIGURES 4 and 5 a nipple 40 is counterbored at 41 with fine screw threads applied in the counterbore which fine screw threads receive a sleeve 42 having a uniform inwardly extending flange 43 with a conically shaped valve seat 44 formed thereon. The inner end of the sleeve 42 abuts a shoulder 42A to provide a limit stop and assure fluid tight connection between sleeve 42 and nipple 40. A lug 45 projects radially inwardly from the inner periphery of the sleeve 42 and is provided with a valve stem receiving aperture 46 which loosely receives the valve stem 47 which carries a valve head 48 on an enlargement 49 which valve head seats against the valve 44 by the force of a compression spring 50 reacting between the lug 45 and a washer 51 secured to the split end 52 of the valve stem 47 thereby urging the valve head into closed position. However, motion of the fluid and pressure of the fluid in a direction toward the right in FIG. 4 will cause the valve head 48 to separate from the valve seat 44 and the fluid will flow around the valve head while reverse motion of the fluid will cause the valve head to close assisted by the spring 50 whereby the valve can operate in all angular positions since the spring has sufficient force to cause the valve to close in any position of the nipple 40.

The covering material 28 of the valve head 26 and the valve head 48 is similar resilient material thereby assuring effective sealing action between the valve head and the valve seat while the limited pivotal movement provided by the clearance at each end of the lever 20 with respect to the disc 26 and the loose sliding fit between valve stem 47 and lug 45 assures that the valve heads will maintain an effective seal and a uniform pressure throughout the periphery thereof.

It will be apparent that the valve unit sleeves are mounted in fluid tight relation by using a pipe fitting compound and by exerting sufficient force to cause the inner end of the sleeve to effectively abut the shoulder formed in the counterbore in its associated nipple.

It will also be apparent that the valve structure including the sleeve may be replaced with a minimum of labor in the event of the need therefor.

It will be apparent that changes can be made within the spirit of the invention as defined by the valid scope of the claims.

What is claimed is:

1. A check valve for operation in a conventional nipple and conventional coupling without increasing the outside dimensions thereof and with a minimum of interference with the flow of fluid therethrough comprising a conventional tubular nipple having a flange extending inwardly adjacent one end to define a D-shaped opening and provide a plane valve seat, a D-shaped valve head adapted to close the D-shaped opening against the flow of fluid into the nipple, a stud projecting from the chord portion of the flange and located inwardly from the outer periphery of the nipple, an arm pivoted to said stud, a boss on said valve head pivoted to said arm intermediate the ends of the arm, said arm extending substantially across the valve head perpendicular to the chord and extending closely adjacent the portion of the valve head opposite the chord whereby the chord edge of the valve head will not extend into the D-shaped opening and the valve head may be substantially parallel to the axis of the nipple and an associated coupling when fully open and lie wholly within a conventional coupling attached to the nipple.

2. The invention according to claim 1 in which the flange is formed on a sleeve of non-corroding material and the sleeve is mounted in a bore of the nipple so the nipple may be made of less expensive material than the sleeve.

3. The invention according to claim 1 in which spring means are provided to react between the stud and the arm to close the valve in any position of the nipple.

4. The invention according to claim 2 in which the nipple is provided with exterior and interior screw threads for securing the nipple to a coupling and for securing the sleeve to the nipple respectively.

References Cited

UNITED STATES PATENTS

| | | | |
|---|---|---|---|
| 390,761 | 10/1888 | Eareckson | 137—454.5 |
| 1,119,909 | 12/1914 | Walling | 137—527.4 XR |
| 2,176,523 | 10/1939 | Brown | 137—527.6 |
| 2,482,198 | 9/1949 | Melichar | 137—527 |
| 3,144,876 | 8/1964 | Frye | 137—454.5 |
| 3,182,682 | 5/1965 | Gilliam | 137—541 XR |

WILLIAM F. O'DEA, Primary Examiner

WILLIAM H. WRIGHT, Assistant Examiner

U.S. Cl. X.R.

137—454.2, 527.4, 527.6